UNITED STATES PATENT OFFICE.

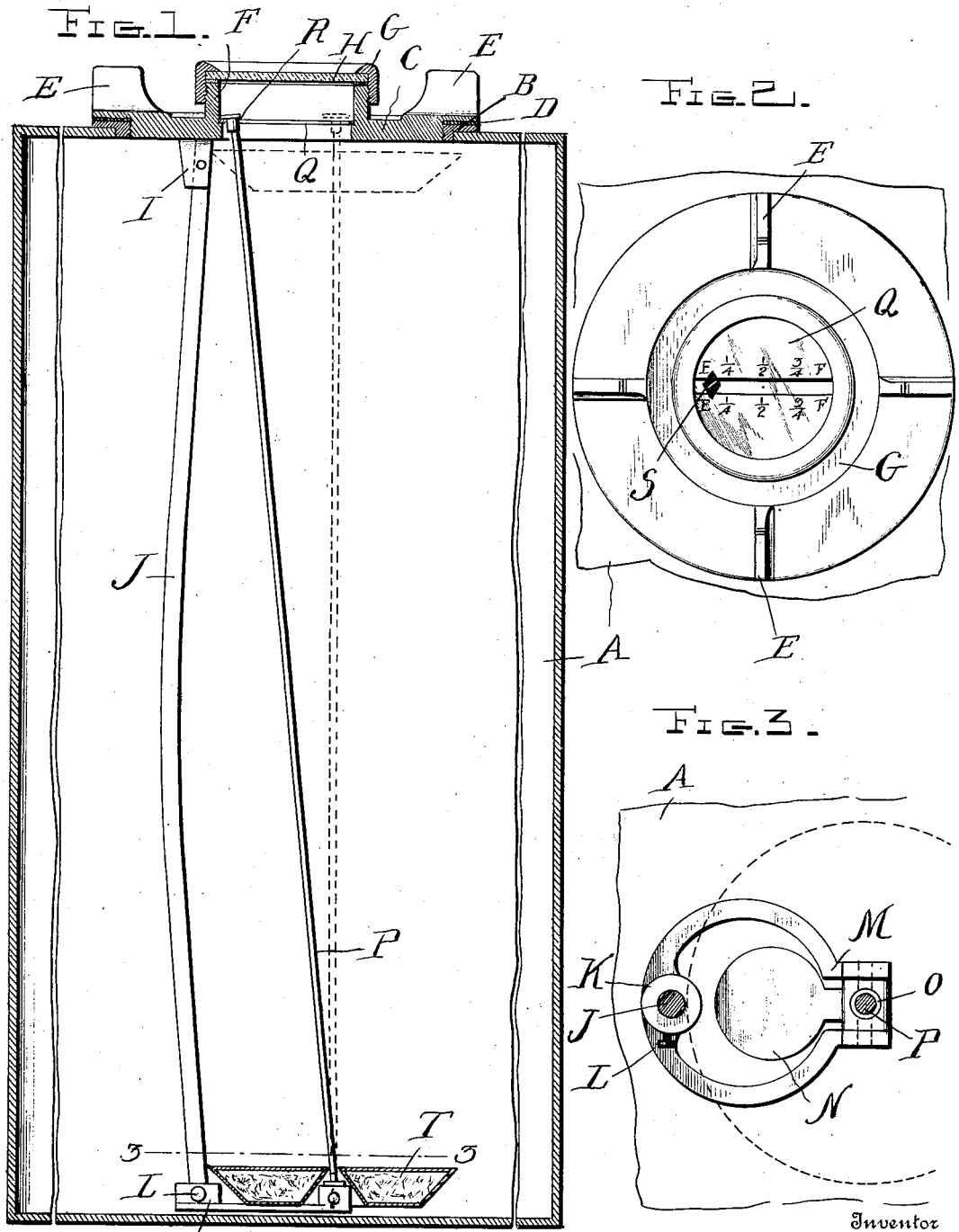

PHELPS M. FREER, OF BARBERTON, OHIO, ASSIGNOR OF TWO-FIFTHS TO HAROLD C. PARSONS, OF AKRON, OHIO.

AUTOMATIC GAGE.

No. 854,481.  Specification of Letters Patent.  Patented May 21, 1907.

Application filed September 12, 1906. Serial No. 334,367.

*To all whom it may concern:*

Be it known that I, PHELPS M. FREER, a citizen of the United States, residing at Barberton, in the county of Summit and State of Ohio, have invented certain new and useful Improvements in Automatic Gages, of which the following is a specification.

This invention relates to improvements in automatic gages or indicators for use in indicating or registering the quantity of liquids in storage vessels, and the object is to provide a simple and improved gage, which will be reliable in action.

With the above object in view, the invention consists in the novel features of construction hereinafter fully described, particularly pointed out in the claims, and clearly illustrated in the accompanying drawing, in which, Figure 1 is a vertical sectional view through a storage tank or other vessel having my improved gage applied thereto; Fig. 2, a top plan view of the same, and Fig. 3, a sectional view on line 3—3 of Fig. 1.

Referring now more particularly to the drawings, A indicates the body of the can or tank having an opening at its top in which a screw-threaded collar B is secured. Closing this opening is a cover C which is formed with a screw-threaded portion whereby it may be screwed into the collar B, and with a circumferentially-extending flange. Between the under side of the flange and the collar B a suitable gasket D is placed. The cover is provided about its circumference with lugs E by means of which it may be conveniently attached to or removed from the tank. The cover is formed with a circular opening, centrally disposed, surrounded by a vertical flange F which is externally screw-threaded to receive a retaining-ring G. This ring has a bead formed upon its circumference to retain a transparent plate H which is positioned upon the upper edge of the flange F, a gasket being placed between the edge of the flange and the under side of the transparent plate. Depending from the under side of the cover plate is a socket I in which the upper end of a slightly bowed or curved rod J is removably secured by a set-screw. To the lower end of said rod a ring-shaped support K is detachably secured by means of a set-screw L. This ring-shaped support is split with the members thereof separated to form bearing-lugs M in which a weight N is pivotally mounted. The arm of said weight is provided with a screw-threaded socket O to receive the lower end of an indicating rod P. The upper end of said indicating rod works in a slot formed in a dial Q. Upon the end of the indicating-rod a cap R is positioned, having a diamond-shaped pointer S, which, when the rod swings back and forth coacts with the graduations on the respective sides of the slot, as shown in Fig. 2. Movable upon the indicating rod is a float T which is shown as formed of cork incased in a metal shell. The float has a recess formed in its under side, whereby, when it is in its lowermost position, it may be in close proximity to the tank.

The operation of my invention is as follows: As the tank is filled with liquid, the float rises, gradually swinging the indicating rod to perpendicular position, thus indicating the amount of liquid in the tank. As the liquid is drawn from the tank, the float is moved downwardly, gradually swinging the indicating rod to its normal position. The rod J is curved so that the movement of the float will be such that the indicating rod will register properly during the entire movement of the float, the weight being sufficient to keep the edge of the float continually in contact with said rod.

Having thus fully described my invention, what I claim as new, and desire to secure by Letters Patent of the United States, is:—

1. An automatic gage comprising a pivoted indicating member, means tending normally to move said indicator in one direction, a float movable on said indicating member adapted to move it in a reverse direction, and a member for guiding the float in its movement.

2. An automatic gage comprising a pivoted indicating member, a weight tending normally to swing said indicating member in one direction, a float movable on said indicating member effecting its movement in a reverse direction, and a member for guiding said float in its movement.

3. An automatic gage comprising an indicating member pivotally mounted at one end, a weight on one side of the pivot of said member tending normally to swing it in one direction, a float movable on said member for overcoming the action of said weight and swinging the indicating member in a reverse direction, and a member for guiding the float in its movement.

4. An automatic gage comprising an indicating rod pivotally mounted at one end, a weight on one side of its pivot tending normally to swing said indicating rod in one direction, a float slidable on said indicating rod for overcoming the action of the weight and effecting the movement thereof in a reverse direction, and a guiding member for the float, said float being held in contact therewith by said weight.

5. An automatic indicator comprising an upright, a support carried by said upright, an indicating rod pivotally mounted at one end of said support, a weight on one side of the pivot of said rod tending to swing it in one direction and a float slidable on said rod for effecting its movement in a reverse direction, said float being held in contact with the upright during its movement by the action of the weight.

6. An automatic gage comprising an upright, a support adjustable on said upright, an indicating rod pivotally mounted at one end of said support, a weight at one side of the pivot of said rod, and a float slidable on said rod and guided by said upright in its movement.

7. The combination with a vessel having a threaded opening, a cover or plate fitting in said opening formed with a circular opening, a collar surrounding said opening and externally screw-threaded, a dial supported by said collar having an elongated slot graduated along one edge, a transparent plate, a retaining ring engaging said plate, a coupling for securing the retaining ring to the collar, a standard arranged in the vessel provided at its lower end with a support, an indicating rod pivotally mounted at the lower end of said support and having its upper end adapted to move in the slot of the dial, a weight on one side of the pivot of the indicating rod, and a float movable upon said indicating rod and guided in its movement by said standard.

8. The combination with a vessel having an opening formed therein, a plate or cover removably secured to said opening, formed with an opening, a dial secured in said opening of the plate, a rod carried by said plate depending into the vessel, a support carried by said rod, an indicating rod pivotally mounted upon said support, a weight attached to said indicating rod upon one side of its pivot, a pointer carried by the upper end of the indicating rod coacting with said dial, and a float movable upon said indicating rod and guided in its movement by the depending rod carried by the cover.

9. An automatic gage comprising a longitudinal bowed rod, a pivotally mounted indicating member, a weight on one side of the pivotal point of said indicating member, and a float movable on said indicating member and guided by said bowed rod.

10. An automatic gage comprising a pivoted indicating member, a float slidable upon said indicating member, a guide for guiding said float in its movement, and means tending to move said indicating member in one direction and to normally hold the float in engagement with the guide.

In testimony whereof I affix my signature in presence of two witnesses.

PHELPS M. FREER.

Witnesses:
   D. E. WEIR,
   E. G. HARTMAN.